United States Patent Office 3,076,721
Patented Feb. 5, 1963

3,076,721
HEAT-SENSITIVE COPY-PAPER AND METHOD OF MAKING
Robert F. Coles, East Oakdale Township, Washington County, Vsevolod Tulagin, Maplewood, and Richard A. Miller, St. Paul, Minn., assignors to Minnesota Mining and Manufacturing Company, St. Paul, Minn., a corporation of Delaware
No Drawing. Filed Oct. 19, 1959, Ser. No. 847,101
20 Claims. (Cl. 117—36.8)

This invention relates to the thermographic reproduction of graphic originals, such for example as printed or typewritten correspondence, sketches, drawings and the like, and has particular reference to novel heat-sensitive copy-sheets for use therein. A commercially important thermographic reproduction process involves brief irradiation of the graphic original with high intensity radiation differentially absorptive thereon, and formation of a visible reproduction of the resulting heat-image on a heat-sensitive copy-paper in heat-conductive pressure-contact therewith. The present invention has particular reference to novel heat-sensitive copy-paper useful in such reproduction process, to methods of making the same, and to certain unique preferred reactant materials employed therein. Specifically, there is involved a new class of heat-sensitive thermographic copy-sheets in which the image areas formed comprise an azo dye. In a preferred form, the azo dye is produced from components obtained from a single colorless compound.

A preferred form of heat-sensitive copy-sheet prepared in accordance with the principles of the invention is represented by the following symbolic diagram:

---
Protective coating (optional)
---
Heat sensitive azo dye forming composition
---
Paper-like substrate
---

Azo dyes are available in a wide variety of colors, provide good stability toward normal environmental influences such as light and humidity, and form effective image areas. Commercial light-sensitive copy-papers containing azo-dye-forming components are in widespread commercial use. Exposure of the sheet to actinic radiation through a positive original, followed by chemical treatment with reactive liquid or vapor, develops a positive copy in which the image areas, corresponding to the image areas of the original, are formed of azo dye. In such papers the reactant material is decomposed by actinic radiation, and the sheet prior to use must therefore be stored under dark conditions. The heat-sensitive copy-sheets of the present invention are essentially insensitive to light and may be handled and stored in the light without discoloration or loss of heat-sensitivity.

A considerable variety of reactions for the preparation of azo dyes is known. In general, these reactions are carried out in solution. The preparation normally involves the formation of a diazonium compound followed by reaction with an azo coupling component, frequently in an alkaline environment, to produce the colored product. One known procedure for forming the diazonium compound involves oxidation. An aromatic sulfonhydrazide is first oxidized with a suitable oxidizing agent; the resulting diazosulfone couples under alkaline conditions with phenolic azo coupling components. Thus, mixing the sulfonhydrazide, coupler, and oxidizing agent in aqueous alkaline solution or in appropriate organic solvent results in the immediate formation of a corresponding dye material.

It has now been found that certain combinations of normally stable reactants capable of forming azo dyes by oxidative coupling reactions may be employed as the color-forming reactant materials in dry heat-sensitive thermographic copy-sheets. The product does not discolor nor lose heat-sensitivity on long continued normal office handling and exposure. It provides clear permanent copies of high contrast and sharp detail. No solutions, fumes or vapors, or other analogous image-developing agencies are required; application of the heat-image by dry thermographic copying procedures is sufficient to produce an immediate direct permanent copy.

The color or hue of an azo dye formed from a specific diazonium compound and specific coupler component may ordinarily be predicted with considerable accuracy based on the chemical structure of the resulting dyestuff. Although such predictions are successful with many of the oxidative coupling systems useful in the present invention, certain preferred systems are surprisingly found to produce colored products which are very much darker in hue than would be predicted based on the normally expected structure. It has thus been found possible to provide white or very slightly colored copy-papers which when heated, as in thermographic copying, produce image areas of unexpectedly dark hue, providing copy of excellent readability.

These preferred copy-papers have the additional advantage of requiring only two reactive components, namely, an oxidizing agent and a color-producing component. The latter is a composite condensation product of an azo coupler component and a diazo-forming component, which, under the influence of the oxidizing agent at the temperature attained during the thermographic copying process, is first cleaved and the components then converted and re-combined to form an azo dye. However the dye formed has a much darker hue than would be expected on the basis of the particular components involved, and the degree of contrast obtained in the final copy is therefore much higher than might be anticipated.

A specific example of a composite compound which, in conjunction with a suitable oxidizing agent, has yielded an effective heat-sensitive copy-sheet capable of producing a deep purplish image on an essentially white background is the compound having the structural formula

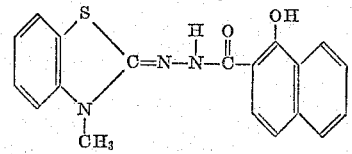

and which is identified as 3-methyl-2-benzothiazolinone 1'-hydroxy-2'-naphthoylhydrazone, melting at 194° C. Cleavage and oxidation of such compound would be expected to yield a diazo fragment and a coupler component having the structures shown within the brackets and undergoing the coupling reaction here indicated:

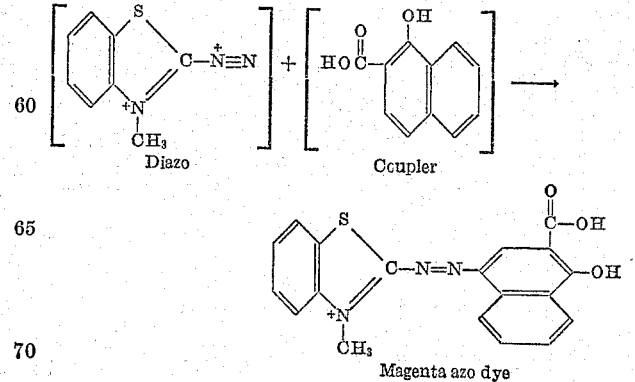

Magenta azo dye

The formation of a deep purple or black rather than a magenta image in copy-sheets employing this composite compound suggests that some other or additional reaction takes place, possibly a coupling of the diazo fragment with the original composite. In any event, and regardless of theory, it has been found possible to produce effective copy-sheets with these composite compounds together with suitable oxidizing agents as the sole color-forming reactants, and therewith to produce surprisingly dark and high-contrast heat-image areas.

In addition, it is found that the composite hydrazone-coupler compounds as above described are significantly less colored than the corresponding simple mixture of hydrazone and coupler, so that the resulting copy-sheet may be made substantially white to provide maximum contrast between image and background areas. The composites are more effective than an equal weight of hydrazone-coupler mixture, permitting economy of materials and again leading to reduction of initial color in the sheet product. The color-forming reaction appears to be more rapid for the composite than for the separate reactants.

On the other hand, a much wider variety of formulations is possible with the separate hydrazone and coupler components than with the less readily available composite compounds, and fully effective copy-sheets have been prepared with such formulations. A typical composition includes 3-methyl-2-benzothiazolinone acetylhydrazone together with an oxidizing agent and an azo coupler component such as a phenol, naphthol, aromatic amine, or alpha-keto methylene coupler component, of which the naphthol-based "Naphtol AS" couplers are preferred. Additionally, the composite hydrazone-coupler compounds have themselves been found to be useful as coupler components in three-component systems employing the acetylhydrazone or analogous reactants.

Oxidizing agents which contain positive halogen atoms attached to nitrogen atoms have been found to be particularly effective. These agents are available as colorless, insoluble, high-melting solids, permitting the preparation of normally stable, rapidly visibly reactive, essentially colorless, heat-sensitive layers. The lower-melting varieties can also be used, the resulting copy-sheets being somewhat less stable under normal handling but being converted to the colored form at more readily attainable copying temperatures. Useful oxidizing agents include the N-halo-succinimides, -phthalimides, -acetanilides, -oxanilides, -benzamides, and certain N-halo-benzene- and N-halo-toluene-sulfonamides. The N-halogen-N-alkyl sulfonamides melting within the range of about 150–200° C., and particularly wherein the halogen is chlorine, combine high stability at room conditions with rapid reactivity under copying conditions; and these compounds are preferred. The carboxamides are less active and require the selection of more readily oxidized hydrazone compounds. The imides, on the contrary, are highly reactive and are useful only with the less reactive hydrazones, and in addition are undesirably odoriferous. A specific preferred compound which has given excellent results is N,N'-dichloro-N,N'-(m-nitrobenzenesulfonyl)-ethylenediamine.

Another class of oxidizing agents which has particular utility in conjunction with compositions containing hydrazones but containing no added coupler component includes the active quinoidal oxidizing agents, such for example as: 1,4 - benzoquinone; 1,2 - naphthoquinone; chloranil. Here the quinone itself is reduced to a hydroxy aromatic coupler component which then couples with the diazo produced by oxidation of the hydrazone. Additional coupler components are not required in these formulas. However the quinones are themselves colored and impart to the copy-sheet a distinct color which is ordinarily undesirable, even though the image areas produced on thermographic copying are distinctly visible thereagainst. The system is therefore mainly effective for use in tinted or colored heat-sensitive copy-sheets. Inert pigments of the same or complementary hue may be added to emphasize or diminish the color of the sheet, or white pigments may be added to dilute the color, but with some loss in intensity of the heat-image.

Other classes of oxidizing agents are known which in solution are highly useful in converting hydrazide to diazo linkage for reaction by coupling in the preparation of azo dyes. These include peroxides, ozonides, inorganic oxidizing agents and perhaps others. Although such materials may be incorporated into heat-sensitive copy-sheets, many of them are difficult or indeed dangerous to handle, or are highly colored, or unduly odorous, or unstable in the presence of organic materials or moisture, or otherwise unsuitable for commercial copy-sheet formulations; and the quinoidal and N-halo type materials and more especially the N-chloro compounds, all as hereinbefore identified, are therefore preferred.

The copy-sheets are conveniently prepared by dispersing each of the reactants separately in extremely fine subdivision in a solution of a suitable resinous or polymeric binder, coating the dispersions either in a single mixture or in separate adjacent layers on a flexible support web, and removing the volatile liquid vehicle by evaporation at temperatures well below the activation temperature. Separate coatings are preferred for components of high reactivity, or to permit use of dissimilar binder and vehicle components for reactants of different solubilities, or to provide improved resistance to moisture, or to minimize the background color imparted by a colored reactant, or for other reasons. On the other hand, since single coatings require less time on the coating and drying equipment and permit lower amounts of material per unit area, it will ordinarily be advantageous to pre-mix the dispersions and apply the mixture in a single coating wherever possible. The coating may be permanently retained on the supporting web, e.g. as a thin surface layer on a paper backing, to provide an easily handled, rugged, opaque and economical product. However the coating may also be dried to a self-ustaining thin film form, e.g. on a polished metal drum, and then stripped therefrom to provide an exceptionally thin non-fibrous copy-sheet. Alternatively, the reactant materials may be incorporated within a fibrous web in the substantial absence of a separate binder.

The relative proportions of reactants have not been found to be critical, although stoichiometric amounts ordinarily give greatest efficiency. The amount of reactant must obviously be sufficient within the reaction zone to provide the desired visible change. Similarly, the amount of binder material is not critical so long as the composition is effectively retained in position on or within the sheet or film and produces effective visible change on heating. Nor does the specific nature of the binder have any significant influence on the operability of the copy-sheet, provided it is chemically inert, does not melt at temperatures reached in the copying process, and can be applied in volatile vehicles which do not themselves cause premature reaction of the reactant components of the coating.

A preferred form of heat-sensitive copy-paper consists of a thin transparent paper carrier web, a heat-sensitive coating, and a further visibly opaque white coating. The heat-sensitive coating produces a strong visible image in the thermographic reproduction process. The transparent paper permits viewing the image as a direct copy of the graphic original and also provides an effective marking surface for subsequent notations as desired. The surface layer affords a degree of physical protection for the heat-sensitive layer and provides an opaque white background against which the image areas have maximum contrast.

In some cases contrast may similarly be improved by incorporation of suitable inert pigments, fillers or the like within the heat-sensitive layer. Other materials may also be added in this way; and particular advantages are frequently obtained by the incorporation of fusible organic materials. Many fusible mild reducing agents such as benzoin, benzoin oxime, and benzilic acid, for example, have been found to lower the copying temperature required while at the same time improving the stability of the copy-sheet against slight darkening or discoloration under storage or in use. Various other fusible materials are similarly effective in improving the reactivity of the sheet in the copying process, without, however, improving the sheet stability to a corresponding degree. Alternatively, additives of these types make possible the preparation of effective copy-sheets with reactants which in the absence of such additives would require such high temperatures or such prolonged reaction times as to be commercially unacceptable. Benzoic acid, benzene sulfonamide, benzamide, urea, and various waxes, fusible in the approximate range 110–155° C. are exemplary.

The temperatures attained at the heat-sensitive layer during thermographic reproduction are difficult to measure directly, and indirect methods have therefore been developed. It has thus been shown that copy-sheets which effectively visibly change on brief contact with a metal test bar heated to a temperature within the approximate range of 90–150° C., and which are not significantly discolored within about two hours at about 50° C., will be found acceptable for making reproductions of typewritten correspondence or the like in commercially available thermographic copying apparatus.

Many of the copy-sheets of the present invention employ reactants none of which by itself fuses, melts, decomposes, or is otherwise visibly altered at temperatures significantly above the maximum test temperature thus determined. For example, a copy-sheet is prepared with approximately equal parts by weight of 3-methyl-2-benzothiazolinone 1'-hydroxy-2'-naphthoylhydrazone melting at 191–194° C. and N,N'-dichloro-N,N'-bis(m-nitrobenzenesulfonyl)-ethylenediamine melting at 178–180° C., applied in a polymeric binder; the sheet is converted from white to purplish black by brief contact with a metal test bar at 120° C. In another example, a mixture of approximately one part by weight of more highly purified N,N' - dichloro-N,N'-bis-(m-nitrobenzenesulfonyl)-ethylenediamine, melting at 189° C., and one part of 3-methyl-2 - benzothiazolinone 1'-hydroxy-2'-naphthoylhydrazone, melting at 194° C., in a polymeric binder on a paper support converts from white to dark purple on brief contact with the metal test bar at 140° C. With the addition of approximately one part of benzoin, melting at 133–7° C., the conversion temperature of the sheet is reduced to approximately 110° C.

One possible explanation is that the several reactants, or some of them, form a mixture of reduced melting point so that melting occurs at test or use temperatures, reaction then occurring between the molten and well-mixed reactants. Another theory is that the tiny particles of reactants are held in an unstable condition under the compression exerted by the film-forming binder as the solution dries, and that the combination of heat and pressure then causes mixing and reaction of the reactive components. Regardless of the theory, however, the invention provides a normally stable heat-sensitive copy-paper capable in thermographic copying processes of reproducing graphic originals by a mechanism involving oxidative coupling and in the form of azo dye image areas, preferably in dark colors on a white background.

The following specific examples will further illustrate but not limit the practice of this invention.

*Example 1*

A mixture of 94.5 grams of 3-methyl-2-benzothiazolinone hydrazone and 135 g. of phenyl 1-hydroxy-2-naphthoate is heated in a suitable flask under vacuum on a bath of molten metal at 160–170° C. for about one hour, until distillation of phenol ceases. The hot solidified product is treated with 300 ml. of chlorobenzene, filtered, washed with benzene and petroleum ether, and dried. It melts at 194° C. and is identified as 3-methyl-2-benzothiazolinone 1'-hydroxy-2'-naphthoylhydrazone. Eighteen grams of this product is ground in a ball mill with a solution of 5 grams of a copolymer of equal parts of styrene and isobutylene in 100 ml. of commercial heptane.

A total of 44.3 g. of m-nitrobenzenesulfonyl chloride is added in portions to a mixture of 6 g. of ethylenediamine, 20 g. of triethylamine, and 300 ml. of pyridine. After completion of the reaction the product is recovered from water, dissolved in dilute sodium hydroxide, and reprecipitated by treatment with hydrochloric acid. Of the resulting purified precipitate, 20.6 g. is taken up in a warm mixture of 150 ml. pyridine and 250 ml. glacial acetic acid, and the mixture further treated with 118 g. of 18% solution of sodium hypochlorite. The filtered and washed product melts at 178–180° C. and is identified as N,N' - dichloro-N,N'-bis(m-nitrobenzenesulfonyl)-ethylenediamine. Of this product, 25 g. is ball milled with 5 g. of the styrene-isobutylene copolymer and 100 ml. of heptane.

Unit weights of each of the two suspensions are uniformly mixed together and applied in a thin uniform layer to map overlay tracing paper by means of a bar-spreader, and the coating is dried in a current of air at room temperature. The resulting sheet material is white in color and forms dense purple-black image areas when heated in thermographic printing or by momentary contact with a test bar heated to about 120° C. The image areas are readily visible through the transparent paper. The unheated sheet does no discolor and remains heat-sensitive under prolonged storage, exposure and use in normal office procedure, but discolors slightly when held at higher temperatures under extreme humidities.

The application over the heat-sensitive coating of a further opaque thin protective layer of three parts of titanium dioxide pigment in two parts of the polymeric binder improves the appearance and stability of the copy-sheet.

*Example 2*

A suspension of 20 g. of benzoin, M. 134° C., in a solution of 5 g. of styrene-isobutylene copolymer and 100 ml. of heptane is prepared in the ball mill, and a unit weight of the suspension is added to the mixture of Example 1. The suspension is coated and dried as before. The resulting copy-sheet is more resistant to discoloration under adverse conditions, and produces an equally strong image at somewhat lower test temperature, than the sheet of Example 1.

Widely different proportions of benzoin may be used, but too little of the material has no observable effect on either the stability or the copying temperature, while excessive amounts dilute the image intensity unduly. However the addition of very small amounts of benzoin or other reducing agents of still higher activity has proven advantageous in formulations containing incidental small proportions of active oxygen or other oxidizing agents, in overcoming the tendency of such compositions to discolor.

For convenience the benzoin and color-forming reactant may be dispersed together in the binder solution, the separately dispersed oxidizing agent being added prior to coating.

Stable heat-sensitive copy-sheets have also been prepared with the reactants of Example 2 dispersed in other binder solutions, including polyvinylpyrrolidone in water containing a trace of "Igepol" non-ionic dispersing agent, ethyl cellulose in absolute ethyl alcohol, and rubbery butadiene-styrene copolymer in toluene.

Example 3

A mixture of 18.9 grams of 3-methyl-2-benzothiazolinone hydrazone and 75 ml. of o-dichlorobenzene is heated at reflux for 24 hours. The effluent vapor is identified as hydrazine. The reaction mixture is diluted with xylene, cooled, filtered, and the product washed with petroleum ether and recrystallized from xylene. The white crystals melt at 260° C. and are identified as 3-methyl-2-benzothiazolinone azine.

Diphenyl ether, 2-aminopyridine, or other inert high-boiling liquid diluents may replace the o-dichlorobenzene in providing a liquid system for ensuring effective control of the reaction.

A coating composition is prepared by separately dispersing, in solutions of 5 g. of polymer in 100 ml. of heptane as in Example 1, 16 grams of the azine as above prepared, 18 g. of 3-methyl-2-benzothiazolinone 1'-hydroxy-2'-naphthoylhydrazone, 20 g. of benzenesulfonamide, and 25 g. of N,N'-dichloro-N,N'-dimethylbiphenylenesulfone-4,4'-disulfonamide, and then mixing the several dispersions in the volume ratio of 1:1:1:2. The mixture is coated on transparent paper in a thin uniform layer, and dried at room temperature. The resulting heat-sensitive copy-sheet converts from white to purplish black within the range 90–130° C. and is useful in thermographic reproduction of graphic originals.

The oxidizing agent employed in the foregoing example is prepared by adding 20 g. of N,N'-dimethylbiphenylenesulfone-4,4'-disulfonamide to 500 ml. of hot glacial acetic acid, adding 200 ml. of 18% sodium hypochlorite solution in a steady stream with stirring, cooling rapidly, filtering, and washing and drying the product, which is found to melt at 195–208° C. The corresponding ethylsulfonamide derivative melts at 187–190° C. and provides a composition reacting at slightly lower conversion temperature. The anilino derivatives are also useful.

Example 4

A stable, high-melting derivative of 3-methyl-2-benzothiazolinone hydrazone is first prepared by dropwise addition of 13.5 g. of phenyl isothiocyanate to a hot solution of 18.9 g. of the hydrazone in 200 ml. of ethanol with constant stirring. Heating is continued for one-half hour after addition is completed. The resulting white crystals are collected, washed with ethanol and with petroleum ether, and dried. The melting point is 168–175° C. and the product is identified as 3-methyl-2-benzothiazolinone 4'-phenylthiosemicarbazone. Sixteen grams of this material, 20 grams of N,N'-dichloro-N,N'-dibenzoylethylenediamine, and 10 g. of benzoin, are each separately dispersed into solutions of 5 g. of polymer in 100 ml. of heptane as in Example 1. Equal volumes of the three dispersions are mixed together and the mixture coated on paper and dried. The resulting white sheet converts to a blue-green at a conversion temperature within the range of 90–130° C. and is useful in thermographic copying.

Surprisingly, the thiosemicarbazone as hereinabove prepared reacts with oxidizing agents in solution in dimethylformamide to yield first a yellow, then a green and finally a deep blue reaction product. Colored products are similarly obtained with the corresponding beta-naphthylthiosemicarbazone. Neither the corresponding semicarbazone derivative nor the ethylthiosemicarbazone produces such results or is useful in preparing copy-sheet materials of the type illustrated in Example 4.

Example 5

A solution of 18.9 g. of 3-methyl-2-benzothiazolinone hydrazone in 200 ml. of hot water containing 10 ml. of concentrated hydrochloric acid is added slowly with stirring to a solution of 10 g. of potassium cyanate in 100 ml. of water and 50–100 g. of ice. After standing for one-half hour the crystalline product is collected, washed and dried. It melts at 208–210° C. and is identified as 3-methyl-2-benzothiazolinone semicarbazone. A mixture of this compound, "Naphtol AS–SW," and an N-chloro oxidizing agent is found to dissolve in dimethylformamide with immediate formation of a purple dye. Dispersions are prepared, as in previous examples, of 16 g. of the semicarbazone, 24 g. of S-acid, 10 g. of benzoin, and 25 g. of N,N'-dichloro-N,N'-bis (m-nitrobenzenesulfonyl)-ethylenediamine, and equal volumes of the four dispersions are mixed together and applied to paper to form a thermographic heat-sensitive copy-sheet.

The addition to the hydrazone molecule of the coupler radical in composites employed in Examples 1, 2 and 3 hereinabove serves to stabilize the former. Thus, the compound 3-methyl-2-benzothiazolinone hydrazone in the presence of separate coupler and oxidizer components is found to be too reactive and the product too unstable for any applications requiring much handling or prolonged storage. The addition of such hydrazone to the components of Examples 1 and 2, for example, renders the resulting copy-sheet susceptible to "finger-printing," i.e. localized smudging at areas contacted by the fingers in handling, and to gradual overall darkening.

The addition of the coupler radical to the hydrazone additionally makes the coupler function available in the one compound, and greatly increases the efficiency of the system in terms of amounts of reactants required; and this method of stabilizing the hydrazone or equivalent is accordingly preferred. Other somewhat less desirable but still useful means of stabilizing are available, however, and have advantages in terms of availability of materials and in other respects; and such formulations are likewise to be included within the scope of this invention.

Example 6

The compound 3-methyl-2-benzothiazolinone acetylhydrazone, M. 258° C., is prepared by dropwise addition of 40 ml. of acetic anhydride to a hot solution of 20 g. of 3-methyl-2-benzothiazolinone hydrazone, M. 135° C., in 200 ml. of benzene. With this compound is used an equal amount by weight of H-acid, i.e. 1-amino-8-hyroxynaphthalene-3,6-disulfonic acid as the coupler component, and N-chloro-N-methyl-m-nitrobenzenesulfonamide as the oxidizing agent. The three reactants are separately milled with styrene-isobutylene copolymer and heptane, and the dispersions mixed together, coated on paper, and dried as in the previous examples. The copy-sheet is sufficiently stable for many non-critical conditions, and the stability is improved by the addition of benzoin or the like as in Example 2. The sheet is cream-colored and when heated in the thermographic copying process produces brown image areas which darken further on standing.

Analogous amide or equivalent condensation products of the hydrazone and other organic acids, e.g. octanoic acid, tetradecanoic acid, benzoic acid, naphthoic acid, phenoxyacetic acid, p-toluenesulfonic acid, likewise are high in melting point and have low solubility in the solvents used with the binder resins, and provide effectively stable coatings for many purposes. The hydrochloride salt is also somewhat improved over the unmodified hydrazone in this respect.

Example 7

An azine condensation composite is first prepared by mixing together a solution of 18.9 grams of 3-methyl-2-benzothiazolinone hydrazone in 200 ml. of hot absolute ethanol and a solution of 20 g. of 2,4-dihydroxybenzaldehyde in 50 ml. of the same solvent. The mixture is heated with stirring for one-half hour and is then cooled. The resulting product is collected, washed with ethanol and with petroleum ether, and dried to yield a light tan solid melting at 240–243° C. and which may be identified as 3-methyl-2-benzothiazolinone 2',4'-dihydroxybenzal azine. An amount of the dry solid equal to 0.05 mole is dispersed in a solution of 5 grams of 1:1 styrene-isobutylene polymer in heptane, by prolonged ball milling. Separately, dispersions of benzoin and of N,N'-dichloro-N,N' - bis(m-nitrobenzenesulfonyl)ethylenediamine are similarly prepared. Equal volumes of the three mixtures are mixed together, the mixture coated at a wet thickness of 1.5 mils on map overlay tracing paper, and the sheet dried at room temperature. Under the thermographic reproduction process the initially substantially white sheet provides a greenish coloration at heated image areas.

A further sheet is made from the same components but with the addition of one volume of a dispersion of 3-methyl-2-benzothiazolinone acetylhydrazone to the three volumes of coating mixture. The resulting copy-sheet produces dense black heat-images. The sheet has exceptional stability, showing no discoloration after prolonged exposure to high humidity at test temperatures of 50° C.

Substitution of the corresponding 2'-hydroxybenzal azine derivative for the 2',4'-dihydroxybenzal azine in the three-component mixture results in a bluish-green image. Similarly, a copy-sheet incorporating the hydroxyl-free benzal azine derivative yields a green image. Still other aldehydes, e.g. 2-hydroxy-5-chlorosalicylaldehyde, or 2-hydroxy-1-naphthaldehyde, likewise are found to form azine type condensation composites with the heterocyclic unsubstituted hydrazones, which composites are useful in the preparation of heat-sensitive thermographic copy-sheets.

Many other equivalent condensation derivatives of heterocyclic hydrazones may analogously be prepared and, in conjunction with suitable oxidizing agents and other reactants as required, may be employed in the preparation of useful heat-sensitive thermographic copy-sheet materials. In all instances the condensation will be seen to involve reaction at the amino nitrogen atom of the heterocyclic hydrazone. Accordingly, condensations of the hydrazono compound with organic sulfonic or carboxylic acids or corresponding acid chlorides or phenyl esters, or with isocyanates, isothiocyanates, hydrazones or other compounds having amine-reactive groups, under typical conditions for such reactions as illustrated in the pertinent examples, are useful in the preparation of condensation composites suitable for incorporation in the copy-sheets of this invention. Where the composite is readily cleaved on oxidation and provides both a diazonium fragment and a coupler fragment, or where oxidation otherwise results in azo dye formation, or where the oxidizing agent itself provides an azo coupler component, no additional coupler component is required although additional coupler may be added if desired. On the contrary, where the composite compound includes a coupler fragment, the compound may itself serve as the coupler moiety in conjunction with an oxidizable heterocyclic hydrazone.

Since the hydrazone linkage rather than the heterocyclic ring is responsible for the diazo group with which the coupling reaction takes place, it will be appreciated that many similar but specifically different heterocyclic structures may be substituted for the 3-methyl-2-benzothiazolinone structure of the foregoing hydrazone compounds and derivatives. The hydrazone must be such as to provide a visibly distinct compound when oxidized and coupled, and must have the necessary physical properties for stability in the coating composition and in the copy-sheet. Thus there may be substituted for the sulfur radical of the benzothiazolinone structure such radicals as —Se—, —O—, —NCH$_3$—, and —CH=CH—. The benzene ring may be converted to a cyclohexene ring, and these or other cyclic side structures, where present, may be further substituted e.g., with —SO$_3$H, —OCH$_3$, —CH$_3$, or —Cl radicals.

The structural formulas of the preferred heterocyclic hydrazones may therefore be indicated as

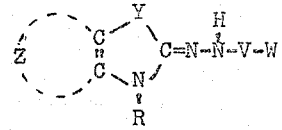

or

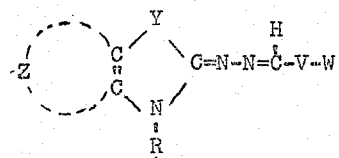

or

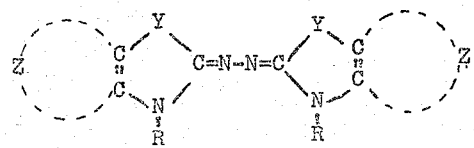

wherein

Z represents the remaining atoms of a cyclic structure;
R is alkyl;
Y is —S—, —Se—, —O—,

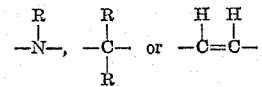

V is

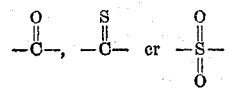

and

W is alkyl, aryl, alkoxy, alkoxyalkyl, aryloxyalkyl, amino, arylamino, or substituted aryl with or without an active coupling position on an aromatic ring, with the further provision that, where W is arylamino, V must be

Equivalent compounds in which the heterocyclic ring contains no cyclic substituents are also useful and are included within the scope of the invention, but such compounds ordinarily produce less intensely colored azo dye reaction products and accordingly are less desirable in heat-sensitive copy-sheet formulations.

Specific exemplary compounds coming within the ambit of the foregoing structure or equivalent thereto include:

3-methyl-2-benzothiazolinone tetradecanoylhydrazone;
3-methyl-x-sulfo-2-benzothiazolinone hydrazone or acetylhydrazone (wherein the x signifies that the specific position of the sulfo group on the benzene ring is uncertain);
3-methyl-2-benzoselenazolinone acetylhydrazone;
3-ethyl-2-benzoxazolinone benzenesulfonylhydrazone;
1,3-dimethyl-5-methoxy-2-benzimidazolinone benzoylhydrazone;
3-methyl-4,5,6,7-tetrahydro-2-benzothiazolinone acetylhydrazone;
1-methylcarbostyril phenoxyacetylhydrazone;
2-methylisocarbostyril acetylhydrazone;
3,3-dimethyl-1-ethyloxindole octanoylhydrazone;
1-methylnaphtho(1,2-d)thiazolin-2-one acetylhydrazone;
3-methyl-2-benzothiazolinone methanesulfonylhydrazone;
3-methyl-2-benzothiazolinone acetylhydrazone;
3-methyl-2-benzothiazolinone semicarbazone;
3 - methyl-2-benzothiazolinone p - toluenesulfonylhydrazone; and
3-methyl-2-benzothiazolinone carbethoxyhydrazone.

As has previously been indicated, the composite hydrazone-coupler compounds are useful also as couplers and in fact may well react in that capacity with the diazo component liberated from a portion of the composite compound on oxidation thereof. More particularly, however, these composite products are themselves capable of providing both the diazo component and the azo coupler component, and thus provide stable copy-sheets of improved contrast and reactivity with reduced amounts of reactive materials. Included among such composites are the following:

3-methyl-2-benzothiazolinone 1'-hydroxy-2'-naphthoylhydrazone;
3-methyl-2-benzothiazolinone 2'-hydroxy-3'-naphthoylhydrazone;
3-methyl-2-benzothiazolinone 1'-phenyl-5'-pyrazolone-3'-carbonylhydrazone;
3-methyl-2-benzothiazolinone benzoylacethydrazone;
3-methyl-2-benzothiazolinone 2'-naphthol-7'-sulfonylhydrazone;
3-methyl-2-benzothiazolinone salicylylhydrazone; and
3-methyl-4,5,6,7-tetrahydrobenzothiazolinone 1-hydroxy-2-naphthoylhydrazone.

Still another class of condensation composite compounds which by themselves on oxidation are capable of providing colored reaction products and which impart improved stability and contrast and at reduced concentration are represented by compounds such as:

3-methyl-2-benzothiazolinone azine;
3-methyl-2-benzothiazolinone 2'-salicylal azine;
3-methyl-2-benzothiazolinone 2',4'-dihydroxybenzal azine;
3-methyl-2-benzothiazolinone 2'-hydroxy-5'-chlorobenzal azine; and
3 - methyl-2-benzothiazolinone 4' - phenylthiosemicarbazone.

As noted hereinbefore, phenols, naphthols, aromatic amines and alpha-keto methylene couplers are all useful in these copy-sheet formulations, but materials of the "Naphtol AS" 3-hydroxy-2-naphthoic arylamide class of azo coupling components have been found particularly desirable both as components of the composite hydrazone-coupler compounds and as components of formulations in which the heterocyclic hydrazone component and the coupler component are independent. Representative examples of coupler components useful in particular in the latter type of formulations are as follows:

2-hydroxy-3-naphthanilide;
N-(2-naphthyl)-2-hydroxy-3-naphthamide;
N-(2-chloro-4-methylphenyl)-2-hydroxy-3-naphthamide;
N-(2,5-dimethoxyphenyl)benzoylacetamide;
1-phenyl-3-methyl-5-pyrazolone;
1-phenyl-3-amino-5-pyrazolone;
S-acid; H-acid; N-phenyl-J-acid
Salicylanilide; salicylamide;
N-(2-naphthyl)-1-hydroxy-2-naphthamide;
Ethyl 1-hydroxy-2-naphthoate;
Phenyl 1-hydroxy-2-naphthoate; and
4,4'-bi-o-acetoacetotoluidide.

Likewise, many other classes of oxidizing agents have hereinbefore been identified as capable of causing oxidative coupling of heterocyclic hydrazones and azo coupler components under suitable conditions. Of these, the organic compounds having a positive chlorine or bromine atom attached to a nitrogen atom, and particularly the N-chloro compounds, are preferred for a number of reasons. Typical representative compounds of this class are as follows:

Chloranil; N-chlorosuccinimide;
N-chlorophthalimide; Chloramine T;
N,N',4,4'-tetrachlorooxanilide;
N-chloro-N-methyl-m-nitrobenzenesulfonamide;
N,N'-dichloro-N,N'-bis(m-nitrobenzenesulfonyl)ethylenediamine;
N,N'-dichloro-N,N'-bis(p-toluenesulfonyl)ethylenediamine;
N-chloro-N-ethyl-m-nitrobenzenesulfonamide;
N,N'-dichloro-N,N'-bis(m-nitrobenzoyl)ethylenediamine;
N,N'-dichloro-N,N'-dibenzoylethylenediamine;
N,N'-dichloro-N,N'-diethylbiphenylenesulfone-4,4'-disulfonamide;
N,N'-dichloro-N,N'-dimethylbiphenylenesulfone-4,4'-disulfonamide;
N,N'-dichloro-N,N'-dimethylbiphenyl-4,4'-disulfonamide; and trichloromelamine.

What is claimed is as follows:

1. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, said layer including an azo coupler component, and (b) a normally solid oxidizing agent for the hydrazone linkage, said components (a) and (b) being maintained in physically distinct, chemically inter-reactive relationship, said copy-sheet being stable under normal office storage and use conditions.

2. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and a carboxylic acid, and (b) a normally solid organic oxidizing agent for the hydrazone linkage, said components (a) and (b) being maintained in physically distinct, chemically inter-reactive relationship, said copy-sheet being stable under normal office storage and use conditions.

3. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an aromatic hydroxycarboxylic acid, and (b) a normally solid organic oxidizing agent for the hydrazone linkage, said components (a) and (b) being maintained in physically distinct, chemically inter-reactive relationship, said copy-sheet being stable under normal office storage and use conditions.

4. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an organic sulfonic acid, and (b) a normally solid organic oxidizing agent for the hydrazone linkage, said components (a) and (b) being maintained in physically distinct, chemically inter-reactive relationship, said copy-sheet being stable under normal office storage and use conditions.

5. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and a cyanate, (b) an azo coupler component, and (c) a normally solid organic oxidizing agent for the hydrazone linkage, said components (a), (b) and (c) being maintained in physically distinct, chemically inter-reactive relationship, said copy-sheet being stable under normal office storage and use conditions.

6. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an aryl isothiocyanate, and (b) a normally solid organic oxidizing agent for the hydrazone linkage, said components (a) and (b) being maintained in physically distinct, chemically inter-reactive relationship, said copy-sheet being stable under normal office storage and use conditions.

7. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an aromatic aldehyde, and (b) a normally solid organic oxidizing agent for the hydrazone linkage, said components (a) and (b) being maintained in physically distinct, chemically inter-reactive relationship, said copy-sheet being stable under normal office storage and use conditions.

8. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid bis-heterocyclic azine, and (b) a normally solid organic oxidizing agent for the hydrazone linkage, said components (a) and (b) being maintained in physically distinct, chemically inter-reactive relationship, said copy-sheet being stable under normal office storage and use conditions.

9. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, and (b) a normally solid organic amide oxidizing agent having a positive halogen atom attached to a nitrogen atom, said components (a) and (b) being maintained in physically distinct, chemically inter-reactive relationship, said copy-sheet being stable under normal office storage and use conditions.

10. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, and (b) a normally solid organic sulfonamide oxidizing agent having a positive halogen atom attached to a nitrogen atom, said components (a) and (b) being maintained in physically distinct, chemically inter-reactive relationship, said copy-sheet being stable under normal office storage and use conditions.

11. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, and (b) a normally solid organic sulfonamide oxidizing agent having a positive chlorine atom attached to a nitrogen atom, said components (a) and (b) being maintained in physically distinct, chemically inter-reactive relationship, said copy-sheet being stable under normal office storage and use conditions.

12. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, (b) a normally solid azo coupler component, and (c) a normally solid organic oxidizing agent having a positive chlorine atom attached to a nitrogen atom, said components (a), (b) and (c) being maintained in physically distinct, chemically inter-reactive relationship, said copy-sheet being stable under normal office storage and use conditions.

13. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, and (b) a normally solid quinonoid oxidizing agent reducible to an aromatic azo coupler component, said components (a) and (b) being maintained in physically distinct, chemically inter-reactive relationship, said copy-sheet being stable under normal office storage and use conditions.

14. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an organic acid, (b) a normally solid organic oxidizing agent having a positive chlorine atom attached to a nitrogen atom, and (c) a normally solid hydoxyaromatic azo coupler component, said components (a), (b) and (c) being maintained in physically distinct, chemically inter-reactive relationship, said copy-sheet being stable under normal office storage and use conditions.

15. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an amine-reactive organic compound, (b)

a normally solid organic oxidizing agent for the hydrazone linkage, and (c) a fusible additive, said components (a) and (b) being maintained in physically distinct, chemically inter-reactive relationship, said copy-sheet being stable under normal office storage and use conditions.

16. The copy-sheet of claim 15 in which the fusible additive is benzoin.

17. A heat-sensitive copy-paper suitable for making thermographic reproductions of differentially radiation-absorptive graphic originals as herein described, comprising in order a thin transparent support web, a heat-sensitive coating, and an opaque protective coating, said heat-sensitive coating on momentary contact of said copy-paper with a metal test bar at a conversion temperature in the range of about 90–150° C. being converted to a visibly distinct form having high contrast with said opaque coating, said visibly heat-sensitive coating comprising an inert film-forming binder and, as color-forming reactants and maintained in physically distinct and chemically inter-reactive relationship, (a) a normally solid condensation composite of a heterocyclic hydrazone and an amine-reactive azo coupler component, and (b) an N-alkyl-N-chloro-sulfonamide oxidizing agent, said reactants (a) and (b) being separately non-fusing at said conversion temperature.

18. A heat-sensitive copy-paper suitable for making thermographic reproductions of differentially radiation-absorptive graphic originals as herein described, comprising in order a thin transparent support web, a heat-sensitive coating, and an opaque protective coating, said heat-sensitive coating on momentary contact of said copy-paper with a metal test bar at a conversion temperature in the range of about 90–150° C. being converted to a visibly distinct form having high contrast with said opaque coating, said visibly heat-sensitive coating comprising an inert film-forming binder and, as color-forming reactants and maintained in physically distinct and chemically inter-reactive relationship, (a) a normally solid condensation composite of a heterocyclic hydrazone and an amine-reactive organic compound, (b) an azo coupler component, and (c) an organic oxidizing agent for the hydrazone linkage, said reactants (a), (b) and (c) being separately non-fusing at said conversion temperature.

19. A heat-sensitive copy-sheet capable of undergoing visible change on brief contact with a metal test bar heated to a temperature within the approximate range of 90–150° C. and suitable for the thermographic reproduction of differentially radiation-absorptive graphic originals as herein described, comprising a thin flexible sheet material including a visibly heat-sensitive layer comprising (a) a normally solid condensation composite of a heterocyclic hydrazone and an aromatic aldehyde, (b) a normally solid condensation composite of a heterocyclic hydrazone and an organic carboxylic acid, (c) a normally solid organic oxidizing agent for the hydrazone linkage, and (d) a fusible additive, said components (a), (b) and (c) being maintained in physically distinct, chemically inter-reactive relationship, said copy-sheet being stable under normal office storage and use conditions.

20. The method of improving the resistance to discoloration of a heat-sensitive copy-sheet capable of undergoing visible change on brief contact with a metal test bar heated to a temperature within the approximate range of 90–150° C. and having a heat-sensitive layer comprising a normally solid condensation composite of a heterocyclic hydrazone and an amine-reactive organic compound, and an oxidizing agent for the hydrazone linkage, said method comprising the step of including with said hydrazone and said oxidizing agent a normally solid mild reducing agent fusible within the range of approximately 110–155° C.

References Cited in the file of this patent
UNITED STATES PATENTS

| | | |
|---|---|---|
| 2,832,764 | Huenig | Apr. 29, 1958 |
| 2,852,504 | Towne et al. | Sept. 16, 1958 |
| 2,875,193 | Riat | Feb. 24, 1959 |
| 2,899,334 | Crevling et al. | Aug. 11, 1959 |
| 2,916,395 | Owen | Dec. 8, 1959 |
| 2,950,213 | Streck | Aug. 23, 1960 |
| 2,955,958 | Brown | Oct. 11, 1960 |
| 2,967,784 | Newman et al. | Jan. 10, 1961 |
| 2,995,465 | Richey | Aug. 8, 1961 |
| 2,995,466 | Sorensen | Aug. 8, 1961 |